(12) United States Patent
Sauer (10) Patent No.: US 10,001,219 B2
(45) Date of Patent: Jun. 19, 2018

(54) DOUBLE SEAT VALVE (71) Applicant: EVOGUARD GMBH, Nittenau (DE)

(72) Inventor: Martin Sauer, Kaisheim (DE)

(73) Assignee: EVOGUARD GMBH, Nittenau (DE)

( * ) Notice: Subject to any disclaimer, the term of this patent is extended or adjusted under 35 U.S.C. 154(b) by 62 days.

(21) Appl. No.: 15/196,934

(22) Filed: Jun. 29, 2016

(65) Prior Publication Data

US 2017/0037974 A1 Feb. 9, 2017

(30) Foreign Application Priority Data

Aug. 7, 2015 (DE) .......................... 10 2015 215 089

(51) Int. Cl.
F16K 1/44 (2006.01)

(52) U.S. Cl.
CPC .............. F16K 1/44 (2013.01); F16K 1/446 (2013.01); Y10T 137/88038 (2015.04)

(58) Field of Classification Search
CPC . F16K 1/44; F16K 1/443; F16K 1/446; Y10T 137/8803; Y10T 137/88038; Y10T 137/88046; Y10T 137/4259
USPC .................. 137/240, 614.17, 614.18, 614.19
See application file for complete search history.

(56) References Cited

U.S. PATENT DOCUMENTS

| 4,373,545 A * | 2/1983 | Knappe | F16K 1/446 137/240 |
|---|---|---|---|
| 5,699,825 A * | 12/1997 | Norton | F16K 1/446 134/166 C |
| 6,178,986 B1 * | 1/2001 | Burmester | F16K 1/446 134/166 C |
| 8,327,881 B2 | 12/2012 | Norton | |
| 2011/0197985 A1 * | 8/2011 | Fontenit | F16K 1/446 137/625.19 |
| 2011/0309285 A1 * | 12/2011 | Sauer | F16K 1/446 251/359 |
| 2013/0192690 A1 * | 8/2013 | Neuhauser | F16K 1/446 137/237 |

FOREIGN PATENT DOCUMENTS

| DE | 102007038124 A1 | 2/2009 |
| DE | 102010046137 A1 | 3/2012 |
| JP | 57154564 A | 9/1982 |

* cited by examiner

Primary Examiner — Michael R Reid
(74) Attorney, Agent, or Firm — Marshall, Gerstein & Borun LLP (57) ABSTRACT In a double seat valve with upper and lower valve discs and a flow divider in a leakage room, wherein respectively one valve disc can be set to a lift position to supplying a cleaning medium flow into the leakage room, and first channels are provided in the flow divider and second channels in the lower valve disc towards a leakage outlet, the first channels are disposed in extensions of the flow divider that axially bridge the lower leakage room part and that join within the second channels the flow divider forming in at least one of two lift positions with its external circumference with the external wall of the leakage room a leakage gap for a side flow that is significantly smaller than a main flow that is deflected and directed by the flow divider into the first channels or into the second channels and to the leakage outlet.

19 Claims, 7 Drawing Sheets

DOUBLE SEAT VALVE

CROSS-REFERENCE TO RELATED APPLICATION

The present application claims priority to German Application No. DE 102015215089.5. The priority application, DE 102015215089.5, is hereby incorporated by reference.

FIELD OF THE DISCLOSURE

The invention relates to a double seat valve.

BACKGROUND

In the double seat valve known from JP 57-154564A, the first channels join a disc-like deflector in the lower part of the leakage room and in alignment to the second channels in the lower valve disc. On the outer circumference, the deflector has a radial seal that interacts with the internal wall of the leakage room in the statistical state and also during axial movements of the deflector. The deflector is charged in the direction towards the lower valve disc through the spring that supports itself on the upper valve disc. In the upper lift position, the cleaning medium that flows in under pressure is led through a circumferential throttle gap before it flows through the first channels. Out of the first channels, the cleaning medium shoots into the lower part of the leakage room where it impinges on the seal of the lower valve disc with considerable pressure before it flows into the leakage outlet via the second channels. In the lower lift position, the cleaning medium enters the lower part of the leakage room in the leakage room through a throttle gap between the lower valve disc and the deflector and flows out through the second channels. Thereby, cleaning medium also flows through the first channels into the upper part of the leakage room where it impacts on the seal of the upper valve disc with considerable pressure. Thereby, there is the risk of leakages on the seals. Effective cleaning in the area of the radial seal of the deflector is made difficult, even if the radial seal of the deflector performs hauling axial movements along the wall of the leakage room.

In the double seat valve known from DE 10 2007 038 124 A1, a circular ring deflector is connected through spokes to a hub that is guided on a drive rod of the lower valve disc. A slide ring that works together with the wall of the leakage room in a sealing way is disposed in the circumference of the deflector. The deflector should shield the direct incoming flow from the respective seal of a valve disc in a way that the seal is not impinged directly and with a high flow speed by the cleaning medium but that the cleaning medium arrives at the seal essentially without pressure and at a low flow speed in the respective lift position. The sealing slide ring of the deflector can be omitted.

In the double seat valve known from DE 10 2010 046 137 A1, the deflector is guided flexibly on the upper and lower valve discs and equipped with a ring seal on the circumference. In each lift position, radial sealing contact between the deflector and the wall of the leakage room is ensured, which makes flawless cleaning of this area difficult. To avoid too strong impingement of the respective seal of a valve disc in each lift position, the cleaning agent is already throttled during inflow into the leakage room.

In the double seat valve known from U.S. Pat. No. 8,327,881 B2, an external ring of the deflector is connected via spokes to a hub that is guided on a drive rod of the lower valve disc and equipped with a radial seal that seals on the wall of the leakage room. In each lift position, the cleaning medium also impinges with a relatively high pressure on the seal of the valve disc that still has a sealing effect.

Double seat valves that are used for example in the U.S. dairy industry have to comply with the requirements of the PMO, Art. 15p (B) (Pastorized Milk Ordinance). Consequently, no direct impingement through cleaning agent may take place during cleaning of a valve seat on the seal that is opposite to such valve seat, and there may only be atmospheric pressure or negative pressure on the opposite seal if a product waits on such seal. Hence, it needs to be ensured that no cleaning agent leaks through the product line and contaminates the product.

SUMMARY OF THE DISCLOSURE

The terms "upper and lower valve discs and upper and lower lift position" relate to the drive of the double seat valve that is usually disposed at the top, i.e. "upper" means closer to the drive and "lower" means facing away from the drive.

The invention is based on the purpose of providing a double seat valve of the type mentioned at the beginning in which leakage of cleaning agents on the sealing valve disc is avoided for certain while there is a measurable negative pressure on the sealing seal and complete cleaning of the leakage room is possible.

As the first channels in the lower extensions of the flow divider bridge the lower part of the leakage room axially and join within the second channels of the lower valve disc or directly in the leakage outlet and not in the lower part of the leakage room, whereby the second channels comprise the extensions on the outside and with radial spacings, a pressure jet pump suction effect results from the cleaning medium flow in each lift position that creates a measurable negative pressure in the part of the leakage room that is delimited by the sealing seal. Although this part of the leakage room is rinsed with cleaning medium through this process, there is no risk of leakage through the sealing seal to the product line. Further, complete cleaning of the leakage room is possible at least in the upper lift position, i.e. also in the area between the circumference of the flow divider and the wall of the leakage room, because a branched-off side flow can pass the leakage gap between the flow divider and the housing, because the side flow cleans the leakage area thoroughly and is already sucked off by means of negative pressure in the area of the sealing seal.

In a useful embodiment, the flow divider also works in the lower lift position. The main flow is then deflected through the two second channels to the leakage outlet in order to create a measurable negative pressure on the sealing seal. The side flow is branched off through the leakage gap, cleans this area thoroughly and is then sucked off by means of negative pressure away from the sealing seal through the first channels to the leakage outlet. In this embodiment, very thorough cleaning of the leakage room is therefore ensured in every lift position without the risk of cleaning medium leaking through.

This embodiment with the circumferential deflecting shoulder in the external wall of the leakage room ensures that the side flow that passes through the leakage gap in the upper lift position will not flow along the wall of the leakage room to the sealing seal and impinge directly on the latter, but that it will be deflected towards the center of this part of the leakage room and sucked into the second channels so that the sealing seal remains protected. The flow divider can hereby sit on the deflecting shoulder in the lower lift position and close the leakage gap at least to a great extent and hence work as a deflector so that this area will only be cleaned quite reliably again in the upper lift position. However, the flow divider supports itself in a useful way in the lower lift position on an end stop of the upper valve disc and at a distance from the deflecting shoulder so that also in this lower lift position cleaning medium passes through the leakage gap in the side flow and cleans this area thoroughly.

In a further embodiment, the flow divider has a collar that is impinged by a pressure spring, which supports itself on a drive rod of the lower valve disc and not on the upper valve disc, in the direction towards the lower valve disc. When the upper valve disc is impinged by a passive spring in a drive of the double seat valve, the forces of the springs add up in order to optimally increase a functionally required sealing force in certain operating positions between the flow divider and the lower valve disc.

In a useful embodiment, the collar of the flow divider is screwed together with a ring insert that is guided on the drive rod of the lower valve disc and that is relocatable in a drive pipe of the upper valve disc. The ring insert supports the spring that impinges on the flow divider and has a shoulder that is aligned in relation to the end stop provided on the upper valve disc. Hence, the flow divider is kept at a distance from the deflecting shoulder in the wall of the leakage room in the lower lift position and the leakage gap remains permeable for the side flow.

The flow divider is functionally sealed and guided relocatably on the inside with its collar on the drive rod of the lower valve disc.

In a useful embodiment, the external wall of the leakage room adjacent to the seat of the upper valve disc has a cylindrical section whose internal diameter is larger than the external diameter of the circumference of the flow divider. Next to it, there is a gradual extension up to the deflecting shoulder that is preferably shorter in the axial direction than the axial height of the circumference of the flow divider. This extension ensures that the side flow will be guided to the deflecting shoulder and deflected effectively by the latter in the direction towards the center of the lower part of the leakage room in order not to impinge directly on the sealing seal.

In this context, the circumference of the flow divider can be either cylindrical so that the leakage gap extends gradually in the direction towards the deflecting shoulder and slows down the side current, which is limited in quantity and throttled, through expansion or that the circumference of the flow divider can even be formed with a circumferential concave midsection, whereby the leakage gap in the area of the gradual extension obtains a nearly even width and whereby the slowed-down side flow is led systematically to the deflecting shoulder that will then deflect the side flow in the direction towards the center of the lower part of the leakage room. It can be said that the side flow is pressed into the deflecting shoulder in order to be diverted to a greater extent on the deflecting shoulder. Thereby, the angle in the midsection within the area of the gradual extension can be equivalent to the inflow angle into the deflection contour so that the side flow will not detach itself from the housing wall and be led away downstream through the gap that leads to the lower seal.

In a useful embodiment, the top side of the flow diverter that faces the upper valve disc has a circumferential sealing edge or sealing lip. A concave cavity can be formed within the sealing edge, whereby the seat of the upper valve disc, which has an axial seal to work together with the seat, is a cone surface that nearly points into the cavity. Therefore, the largest part of the cleaning medium that enters in the upper lift position will be forced past the leakage gap and into the first channels, and only a minor leakage flow is partitioned off as a side flow through the leakage gap. The sealing edge is for example situated in the open position of the seat valve on the bottom side of the upper valve disc or its seal and seals at that point so that no product can enter the leakage room.

In a useful embodiment, the external diameter of the circumference of the flow divider is larger than the internal diameter of the seat of the lower valve disc. For the sake of usefulness, this seat is a cylinder surface for a radial seal of the lower valve disk. The top side of the lower valve disc can have a circumferential sealing edge aligned to the bottom side of the flow divider that is for example pressed tightly against the flow divider in the open position of the double seat valve. Further, the top side of the lower valve disc that faces the flow divider should be sloped towards the inside, preferably have a conical shape, in order to ensure a favorable deflection and flow condition into the second channels in the lower lift position.

For the sake of functionality, the cylindrical seat of the lower valve disc that extends nearly up to the deflecting shoulder is axially longer than the axial distance from the deflecting shoulder to the seat of the upper valve disc. This dimensioning ensures that the leakage room to the product is sealed flawlessly while the double seat valve is set to the open position that connects the product lines.

In a useful embodiment, each extension of the flow divider contains as a first channel at least one, preferably even two or multiple boreholes that are inclined in a slant inward direction towards the leakage outlet. Also the external contour of the extension within the second channels can gradually taper off in the direction towards the leakage outlet. A nozzle effect through which the pressure jet pump suction effect is intensified is achieved by means of this concept.

In this regard, the negative pressure created through the respective main flow increases in the respective sealing seal with a growing inlet pressure of the cleaning medium according to a predefined regularity. This regularity can be nearly proportional and/or essentially continuous.

For the sake of functionality, the leakage outlet has a funnel-shaped collecting section whose funnel wall inclination is equivalent at least to the greatest extent to the slope of the first channels and/or extensions and of the external walls of the second channels in the lower valve disc. This is useful with regard to favorable outflow conditions in a cleaning cycle because the collection section continues, so as to say the nozzle effect of the first and second channels. In this context, it can be useful if the collecting section is transferred either directly or through a cylindrical section into a continued but conically extending section because the flow from the first and second channels will then at first be accelerated in the collecting section but subsequently expanded and slowed down so that undesired splashing effects are avoided.

In a useful embodiment, the flow divider has at least one axial guiding groove for encroachment of a guiding nose of the lower valve disc on the inside, e.g. in the area of the extensions. This encroachment ensures even spacings between the external contours of the extensions and the internal walls of the second channels. This creates flawless flow conditions with as little turbulence as possible of the cleaning medium under pressure.

Further, a concave and rounded guide fin that is designed, so as to say, as a circumferential cavity in the bottom side of the upper valve disc and that is aligned to the leakage gap in the bottom side of the upper valve disc that faces the flow divider is important. This guide fin leads the side flow that passes through the leakage gap in the lower lift position to the center of the upper part of the leakage room and past the sealing seal of the upper valve disc, and also ensures flawless inflow conditions into the first channels.

For the sake of functionality, the flow divider is made of fiber-reinforced or unreinforced plastic. A suitable material for this purpose is for example PEEK because it has a very even surface, it is wear-proof and also resistant against aggressive cleaning media.

Alternatively, the invention could also be explained as follows:

Double seat valve for the separation of media, with a valve housing that has connecting pieces for a first pipe and a second pipe, with a first closing component and a first closing component seat associated to such closing component, whereby the first closing component stands in sealing contact with the first closing component seat through at least one sealing element, and with a second closing component at an axial distance from the first closing component and a second closing component seat associated to such second closing component, whereby the second closing component stands in sealing contact with the second closing component seat in its closing position through at least one sealing element, whereby the two closing components can be vented independently of each other by their respective closing component seat in lifting positions, and whereby there is a leakage room between the two closing components, characterized in that a flow dividing element is disposed between the two closing components that divides a flow of cleaning medium into two flow parts during venting of one of the two closing components, whereby a first flow part is led into a leakage outlet and a second flow part in the direction onto the other closing component in the closing position and/or onto its sealing element.

In particular, the division will only take place if the upper closing component is lifted (up to the drive). Alternatively, the division can also take place in addition during lifting (away from the drive) of the lower closing component.

Lifting of the two closing components in opposite directions preferably never takes place at the same time but always alternatingly or independently of each other. In other words, for example the upper closing component is only lifted during cleaning while the lower one is closed. Likewise, the lower closing component will only be lifted during cleaning if the upper closing component is in the closing position. On the other hand, both closing components can be lifted out (removed from their sealing position) of their closing position (preferably in the same direction) if no cleaning process takes place but if a product, i.e. for example a beverage or a medical fluid, should flow between the product lines.

The invention also comprises a method for cleaning a double seat valve formed as explained above with the following steps:

provision of a double seat valve for the separation of media, with a valve housing that has connecting pieces for a first pipe and a second pipe, with a first closing component and a first closing component seat associated to this first closing component, whereby the first closing component in its closing position is in sealing contact with the first closing component seat through at least one sealing element, and with a second closing component that is at an axial distance from the first closing component and a second closing component seat that is associated to this second closing component, whereby the second closing component in its closing position is in sealing contact with the second closing component seat through at least one sealing element, whereby the two closing components are vented independently of each other and successively by their respective closing component seat, division of the room and/or leakage room between the two closing components by means of a flow divider into an upper leakage room part and a lower leakage room part, and performance of one of the following steps a) venting of the lower closing component and guiding of a cleaning medium flow into the leakage room, whereby a first flow part of the cleaning medium flow is led past the flow divider radially on the outside into the upper leakage room part and a second flow part of the cleaning medium flow is led at the same time into the lower leakage room part, whereby the second flow part is led out of the lower leakage room part into a leakage outlet towards the bottom (towards the center of the Earth) while it creates a negative pressure in a passage opening that exists in the flow divider, which impacts on the first flow part in a way that this first flow part is sucked by the negative pressure through the first leakage room section in the direction of the leakage outlet or directly into such leakage outlet through the passage opening, b) venting of the upper closing component and leading of a cleaning medium flow into the leakage room, in particular into the upper leakage room part, whereby a first flow part of the cleaning medium flow is led past the flow divider radially on the outside into the lower leakage room part and a second flow part of the cleaning medium flow is led at the same time through the upper leakage room part, whereby the second flow part is led out of the upper leakage room part through a passage opening into the lower leakage room part and subsequently into a leakage outlet or directly into the leakage outlet to the bottom (towards the center of the Earth) while creating a negative pressure which impacts on the first flow part in a way that this first flow part is sucked by the negative pressure through the lower leakage room part in the direction of the leakage outlet.

In the steps a) and b), the volumetric flow of the first flow part (side flow) is in particular smaller than the second flow part (main flow). With regard to the device, the radial cross-section on the outside past the flow divider is smaller than the cross-section in the passage opening.

The passage opening in both cases a) and b) is disposed preferably between a central valve axis and the outermost point at a radial distance from the central axis.

The first flow part cleans in both cases a) and b) in particular in the external radial area of the flow divider.

In case a), the first flow part is deflected in the direction of the central axis of the valve, in particular by a deflection surface that exists in the closing component.

In case b), the first flow part is deflected in the direction of the central axis of the valve, in particular by a deflection surface that exists in the valve housing.

In both cases, deflection can also replace the creation of the negative pressure in case of a suitable design.

BRIEF DESCRIPTION OF THE SEVERAL VIEWS OF THE DRAWINGS

Embodiments of the object of the invention are explained by means of the drawing. The figures show.

DETAILED DESCRIPTION OF THE PREFERRED EMBODIMENTS

Figure 1:
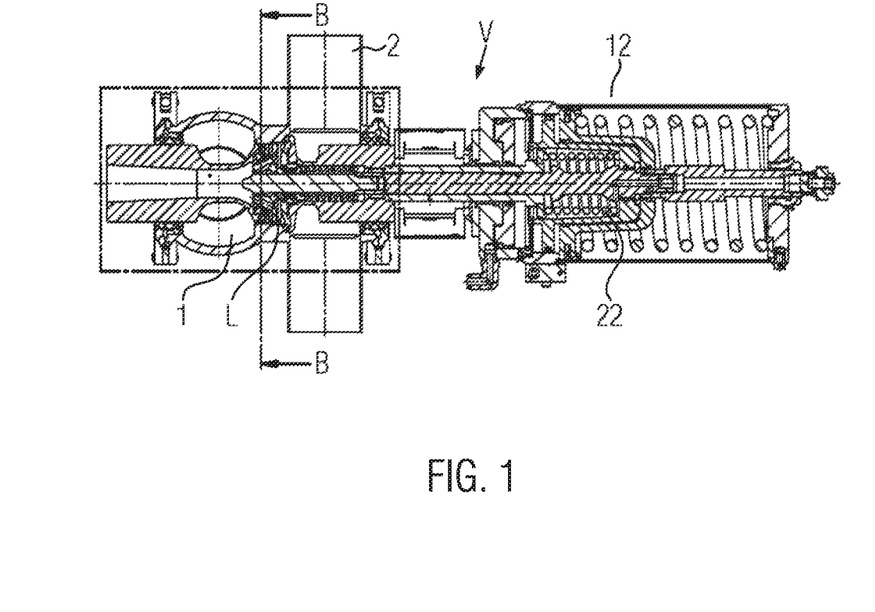
FIG. 1 a longitudinal section of a double seat valve in a closing position.
Figure 2:
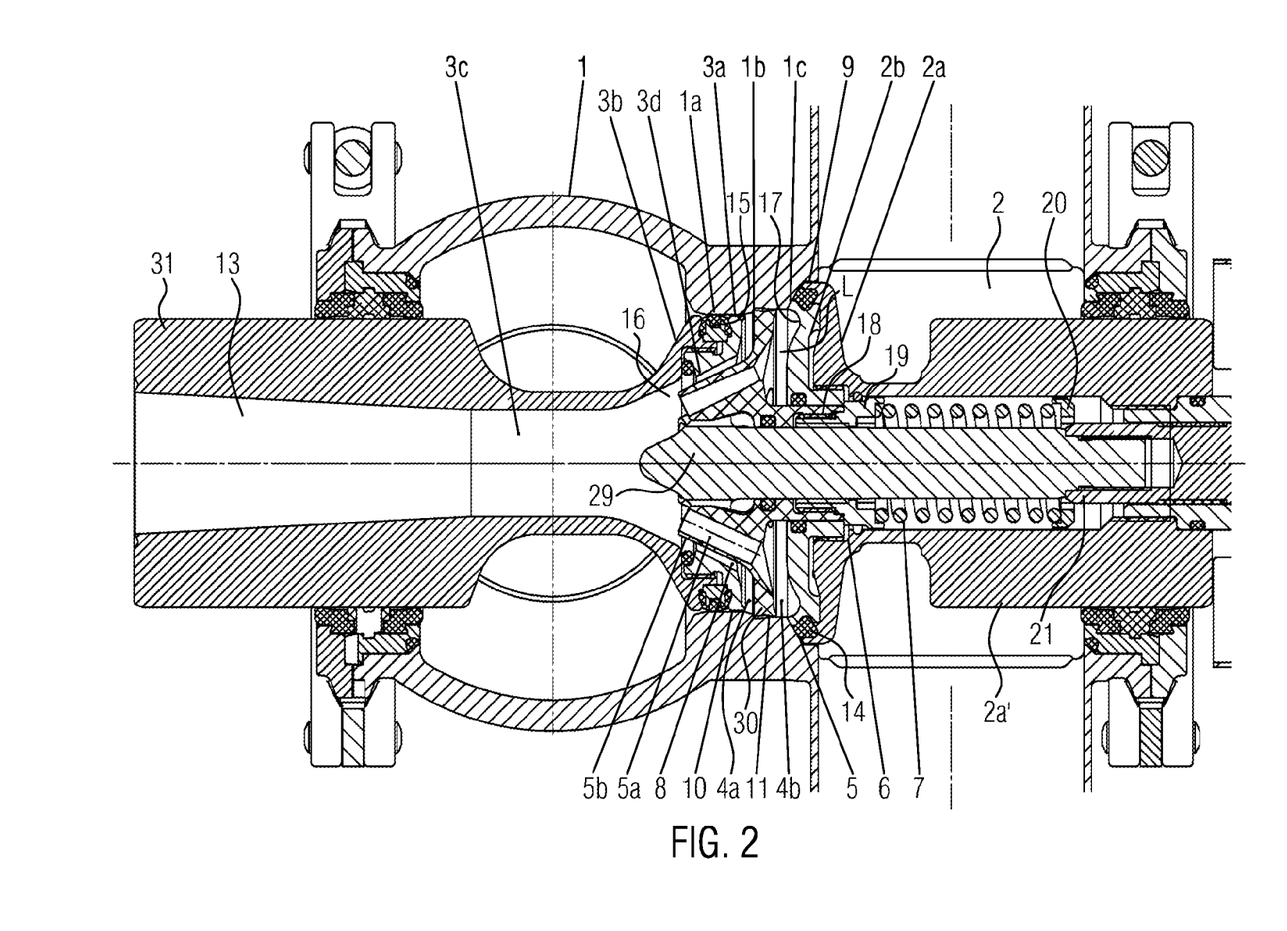
FIG. 2 an enlarged section of the longitudinal section from FIG. 1.
Figure 3:
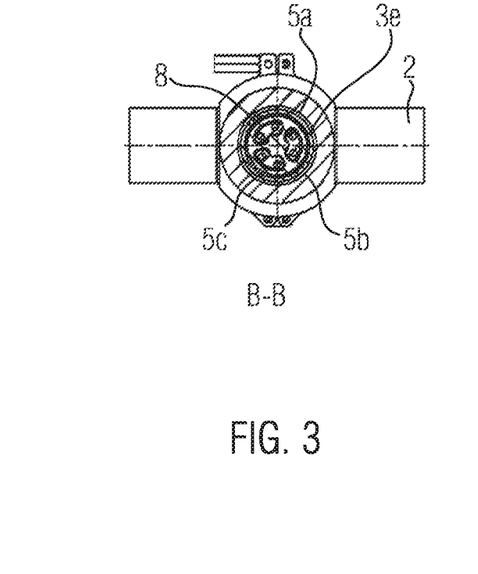
FIG. 3 a section view in the section plane B-B in FIG. 1.

A double seat valve V in a closing or locking position shown in FIGS. 1 to 3 is used for selective separation or connection of media or product lines 1, 2 (first and second pipes) in a leakage room L and for example connecting pieces for the valve housings that bear the product lines 1, 2. The double seat valve V is operated for example by means of a pneumatic drive 12 that contains several pistons and springs as well as a passive spring 22 in this case (FIG. 1).

A two-piece upper valve disc 2a, 2b (first closing component) is connected to the drive 12 through a drive pipe 2a' and contains a seal 14, here an axial seal, to interact with a seat 1c (first closing component seat) in the valve housing. The seat 1c is a cone area that comes in contact with a cylindrical section 17 in the direction towards a deflecting shoulder 1b on the external wall of the leakage room L. From the deflecting shoulder 1b, an essentially cylindrical seat 1a (second closing component seat) extends for a radial seal 15 of a lower valve disc 3a, 3b (second closing component). The lower valve disc 3a, 3b is connected to a drive rod 29 that is screwed together centrally with a drive rod 21 to the drive 12. A funnel-shaped leakage outlet 16 is formed inside a leakage pipe 31 in the lower valve disc 3a, 3b. In this case, the leakage outlet 16 has a funnel-shaped collecting section that is prolonged by a cylindrical section 3c that is adjacent to a conically extending section 13. The leakage pipe 31 is led out of the valve housing in a sealed way.

In the leakage room L, a generally circular ring-shaped flow divider 5 is disposed between the upper and lower valve discs 2a, 2b; 3a, 3b and is sealed on the valve disc rod 29 and has a collar, which is screwed together with a ring insert 19 that works as a spring abutment of a pressure spring 7 that rests with its other end on an abutment ring 20 that can be moved on the inside of the valve disc 2a but that fits close on the end of the drive rod 21.

The upper valve disc 2a, 2b has an end stop 6 for the ring insert 19 that intercepts the flow divider 5 charged by the pressure spring 7 at an axial distance from the deflecting shoulder 1b when it touches the end stop 6.

The flow divider 5 has an external circumference 30 that defines a leakage gap 11 with the external wall of the leakage room. According to FIG. 2, the external circumference 30 of the flow divider has a circumferential midsection 25 (FIG. 6) that has approximately the same angle in its section that faces the lower valve disc 3a, 3b as a gradual extension 27 to the deflecting shoulder 1b in the external wall that is adjacent to a cylindrical section 26 up to the conical valve seat 1c.

Figure 5:
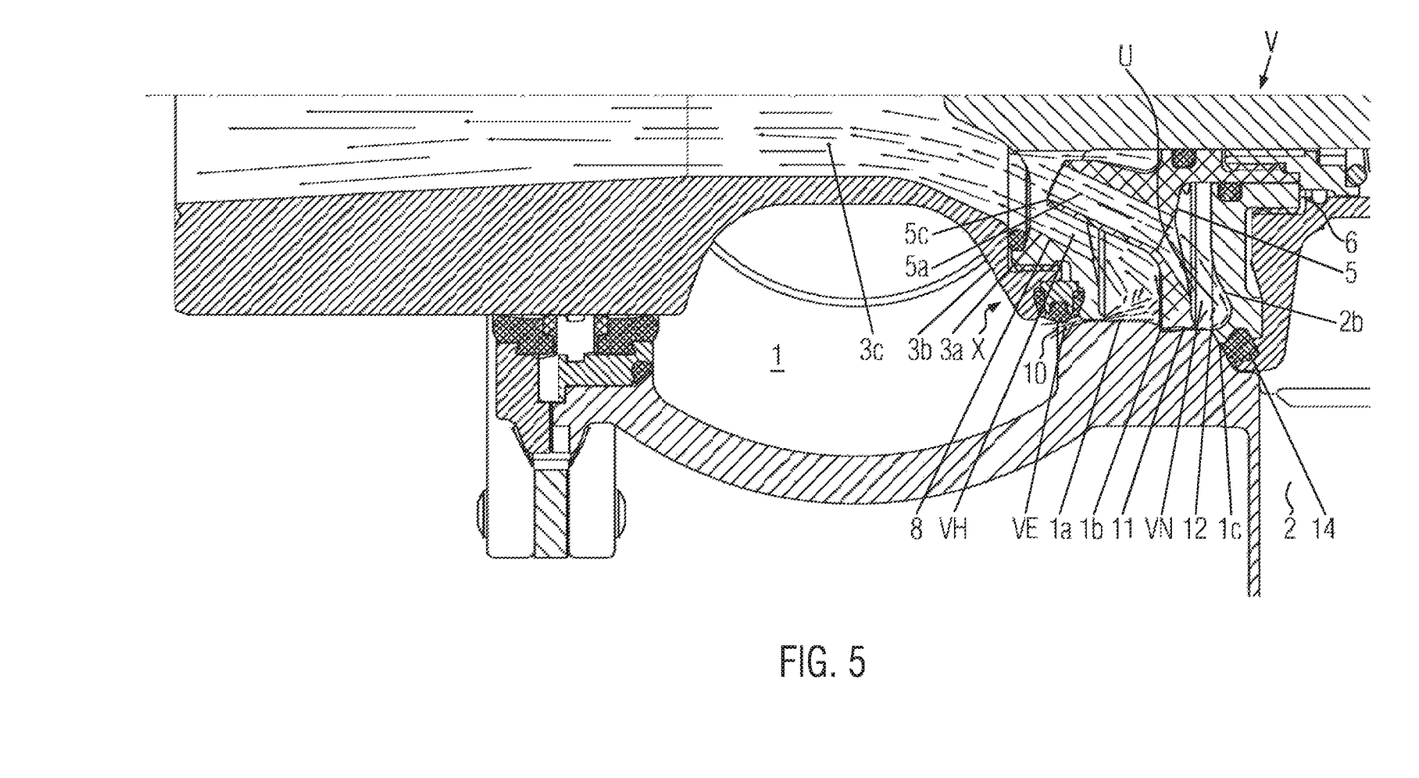
FIG. 5 the double seat valve in a lower lift position.

The flow divider 5 delimits a lower and an upper leakage room part 4a, 4b in the leakage room L, respectively adjacent to the seal 14 and/or the seal 15. Between the lower valve disc 3a, 3b, especially between its upper part 3a and the seat 1a, there is a throttle gap 10 with a dimension that is usual for such double seat valves, at least in the lift position that is shown in FIG. 5.

Figure 4:
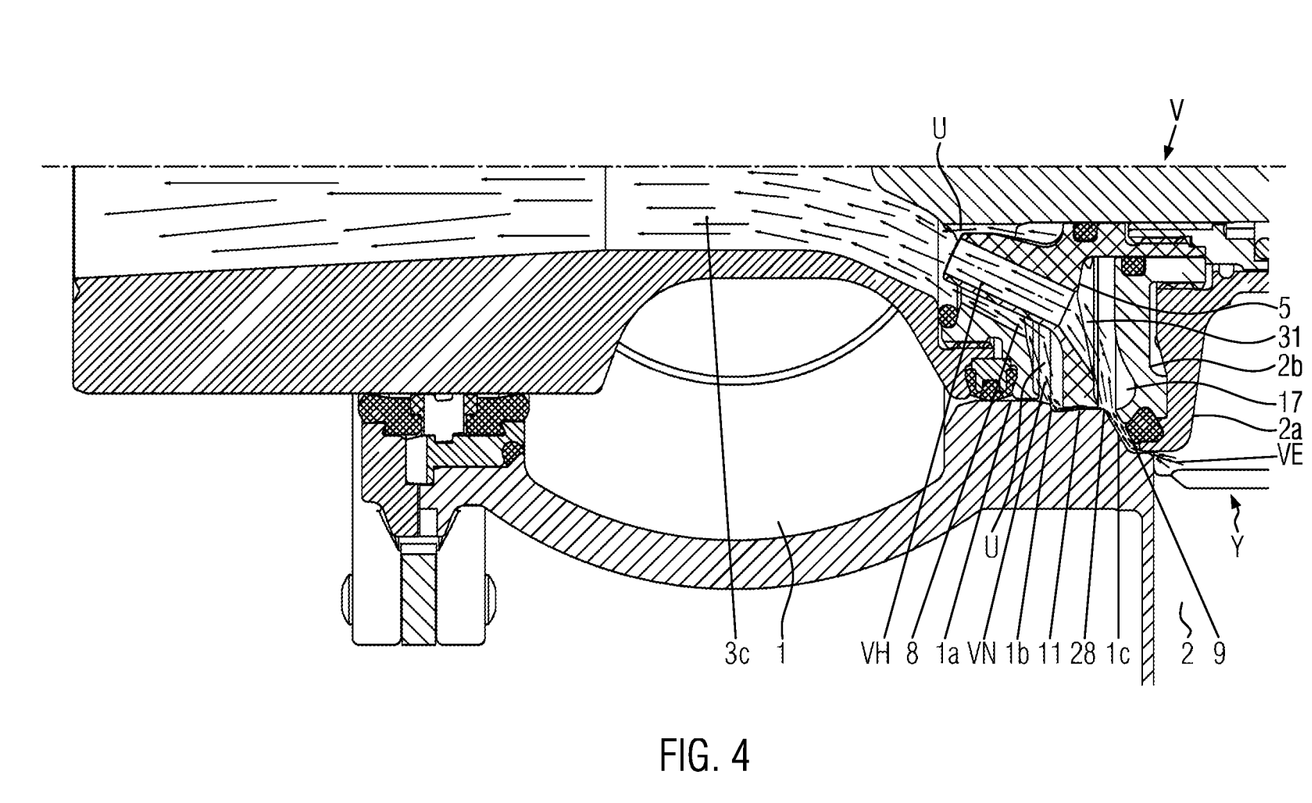
FIG. 4 the double seat valve in an upper lift position.

In the flow divider 5 that has a cavity 31 on its top side that faces the upper valve disc 2a, 2b according to FIG. 4, first channels 5a, which join second channels 8 that are formed in the lower valve disc 3a, 3b and that are preferably inclined in a slant inward position in the flow direction towards the leakage outlet 16 just as the first channels, are provided in the extensions 5b that bridge the lower leakage room part 4a. The transition edge (FIG. 4) from the valve seat 1c to the cylindrical section 26 is indicated with 28. In the bottom side of the upper valve disc 2a, 2b that faces the top side of the flow divider 5, a circumferential, concavely rounded guide fin 17 (FIG. 4) is formed whose externally situated edge is aligned approximately to the leakage gap 11 in an axial direction.

Figure 7:
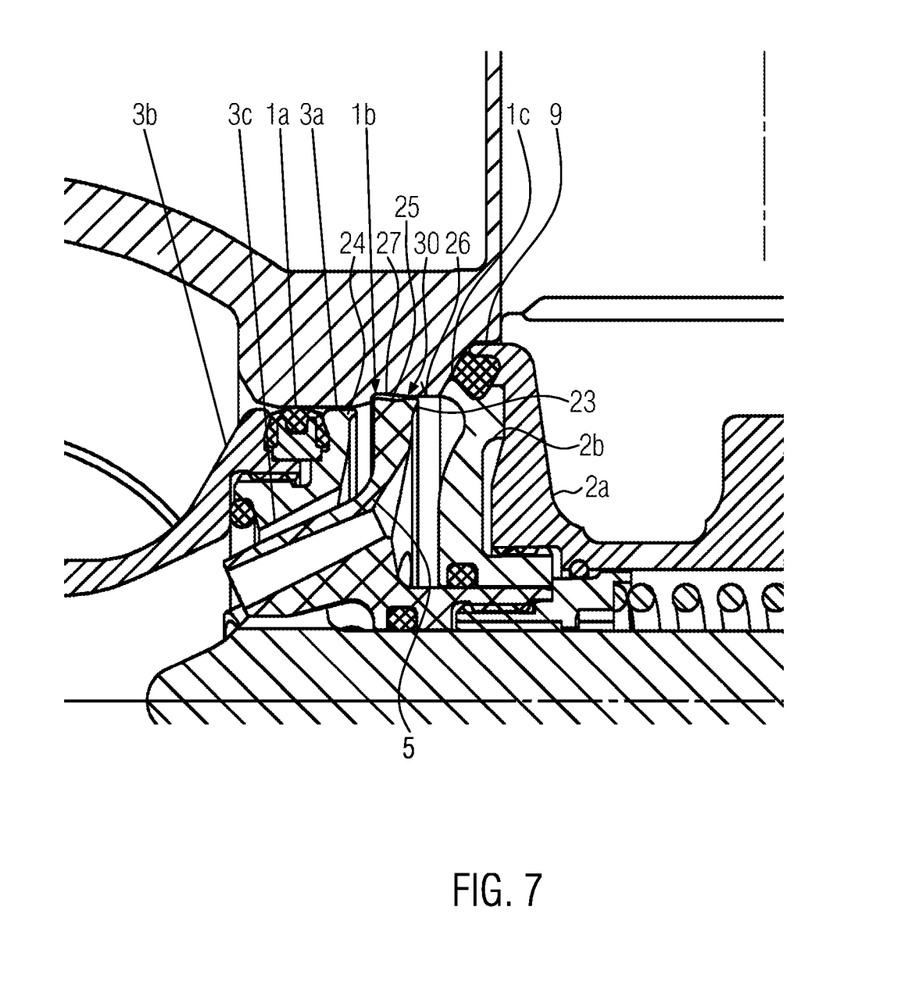
FIG. 7 an enlarged detail relating to FIG. 2.
Figure 8:
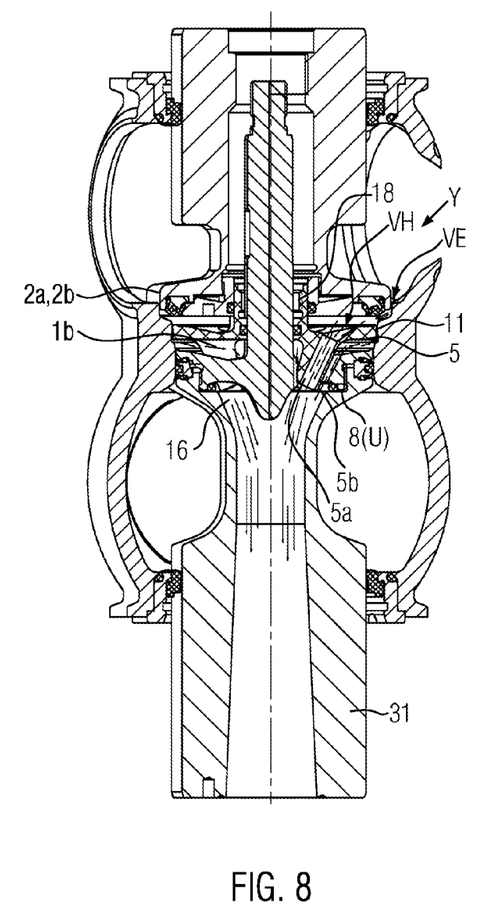
FIG. 8 a further embodiment of the double seat valve in the upper lift position, and FIG. 9 the double seat valve from FIG. 8 in the lower lift position.
Figure 9:
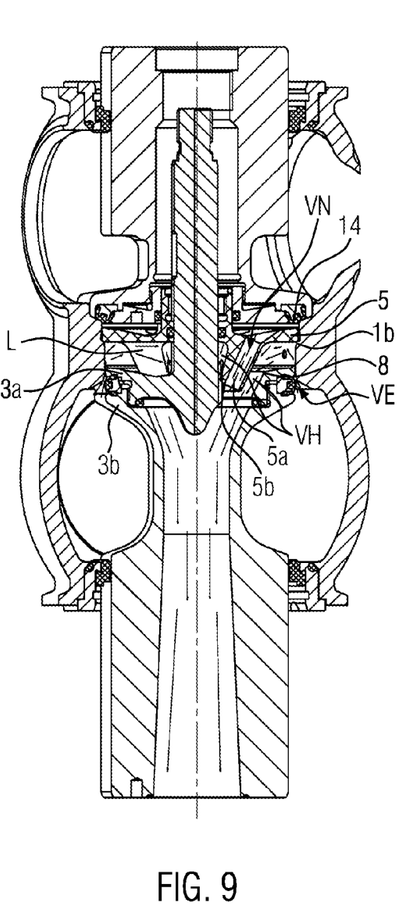

As can be seen more clearly in FIG. 7, the external diameter of the circumference 30 of the deflector 5 is greater than the internal diameter of the seat 1a, and on the outside of the lower valve disc 3a, 3b, a circumferential sealing edge 24 is provided for interaction with the bottom side of the flow divider 5, and also on the top side of the flow divider 5, a circumferential sealing edge 23 is provided for interaction either with the bottom side of the upper valve disc 2a, 2b (FIG. 7) or with the seal 14 that reaches inwards through the seat 1c according to FIG. 8 or 9. The external contours of the extensions 5b taper off in the direction towards the leakage outlet 16 just as the external walls of the second channels 8 in the lower valve disc 3a, 3b. The second channels 8 surround the extensions 5b on all sides with a radial distance so that (FIG. 3) a defined distance to the wall of the respective second channel 8 is ensured. In the displayed embodiment, two first channels 5a in form of for example cylindrical boreholes are contained in each extension 5b.

To ensure a constant width between the external contours of the extensions 5b and the walls of the second channels 8, the flow divider 5 can be equipped with at least one guiding groove 5c in which at least one guiding nose 3e of the lower valve disc 3a, 3b encroaches (FIG. 3) so that the flow divider 5 cannot distort itself in relation to the lower valve disc 3a, 3b. Further, a throttle gap 9 (FIG. 2) is formed between the upper valve disc 2a, 2b and the valve housing in the locking and lift position.

The flow divider is for example made of plastic such as PEEK and can be an injection-molded part.

FIG. 4 shows the double seat valve V in an upper lift position Y, in which the upper valve disc 2a, 2b is slightly raised from the seat 1c and in which a cleaning cycle is performed with a cleaning medium such as hot water in the leakage room L, in the seat 1c, on the upper valve disc 2a, 2b, on the deflector 5 and up to the seal 15 of the lower valve disc while the lower valve disc maintains its sealing position in the seat 1a and the product line 1 still contains a product where appropriate. The product line 2 is in the cleaning step and supplies a pressurized, for example liquid cleaning medium whose flow is indicated by arrows in FIG. 4.

In the upper lift position Y in FIG. 4, the upper valve disc 2a, 2b has lifted the flow divider 5 further off the deflecting shoulder 1b than shown in FIG. 2 so that the second channels 8 have larger widths than in FIG. 2.

FIG. 5 shows the double seat valve V in a lower lift position X in which cleaning medium is led under pressure from the product line 1 through the throttle gap 10 into the leakage room L while the upper valve disc is sealed on the seat 1c and while, where appropriate, a product is contained in the product line 2. The flow divider 5 rests on the end stop 6 and maintains an axial distance from the deflecting shoulder 1b. The lower valve disc 3a, 3b is set further downwards than in FIG. 2 so that the radial seal is moved out of the seat 1a and the throttle gap 10 is open.

Figure 6:
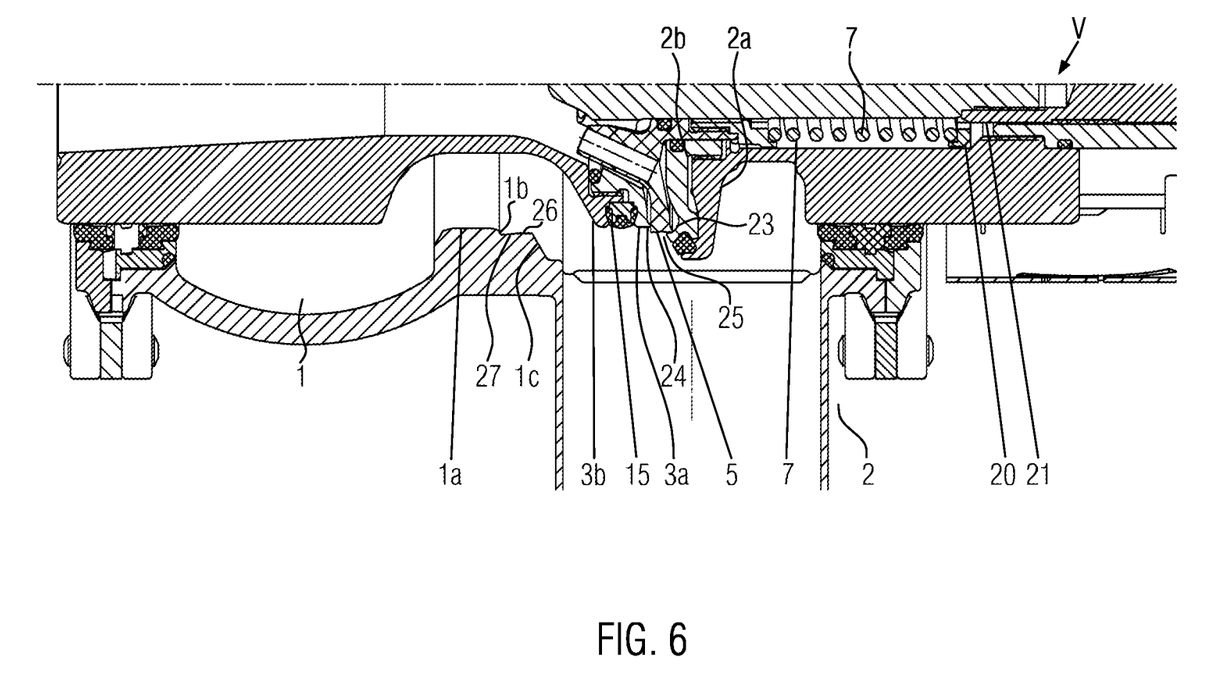
FIG. 6 the double seat valve in an open position.

FIG. 6 shows the double seat valve V in the open position in which the product lines 1 and 2 are connected to each other and the flow divider 5 is wedged between the upper and lower valve discs 2a, 2b; 3a, 3b with a preload, whereby the sealing edges 24, 23 are effective. The upper and lower valve discs are pressed against each other by the passive spring 22 (FIG. 1) in this context. When both valve discs are set away from their seats 1a, 1c in the direction towards the drive 12 (FIG. 1), an additional pressing force is created by the spring 7 between the flow divider 5 and the lower valve disc 3a, 3b.

Function

In the closing position of the double seat valve V shown in the FIGS. 1 to 3, the product lines 1, 2 are separated from each other. Product that might have entered the leakage room L in the preceding closing process can run off through the leakage pipe 31 but moistens areas in the leakage room. To ensure complete cleanability of the leakage room L and to perform a simultaneous flow deflection of a cleaning medium on the seal that is respectively opposite to the entry point and to create a measurable negative pressure in relation to the ambient pressure of the double seat valve, which is stable over a wide range of process parameters at this point, the solution according to the invention is configured accordingly with the flow divider 5. The flow divider 5 is not used to shield off the flow to the respective opposite seal but to divide cleaning medium that flows in into two different flows of which one is led in a direction towards the leakage pipe 31 and the other in the direction of the respectively opposite valve disc. Also the concentrically disposed first and second channels 5a and 8 that are set into each other are used for this purpose. The flow divider 5 is always surrounded by the flow in its surface part that faces the product during cleaning of one of the seats.

The sum of the cross-section areas of the first and second channels 5a, 8 is always multiple times larger than the cross-section area of the respective throttle gap 9 or 10 through which cleaning medium flows in. The sum of the cross-section areas of the first and second channels 5a, 8 is further multiple times larger than the cross-section of the leakage gap 11 between the valve housing and the flow divider 5. Through this cross-section conditions and through accordingly favorable geometries in terms of flow, respectively in the area of the smaller cross-section, the required unequal distribution of the cleaning medium flow is achieved. Through the constriction in the leakage outlet 16, a closed column is formed there of the cleaning medium, which flows away with a high speed. A negative pressure U is created intentionally in certain areas of the leakage room L through a pressure jet pump suction effect in the first or second channels 5, 8.

Upper Lift Position Y in FIG. 4

For cleaning of the upper seat 1c, the upper valve disc 2a, 2b is moved upwards until cleaning medium flows in from the product line 2, which meanwhile contains cleaning medium under pressure, through the throttle gap 9 and past the seal 14. The flow divider 5 is thereby lifted with the upper valve disc 2a, 2b in relation to the deflecting shoulder and forms the leakage gap 11 below the entry edge 28 of the seat 1c. The cleaning medium VE that flows in under pressure is guided through the slope of the seat 1c across the leakage gap 11 in the direction towards the first channels 5a in the flow divider 5. A main flow VH, indicated by the arrows in FIG. 4, flows through the first channels 5a and is injected with a high speed into the leakage outlet 16 towards the bottom. Consequently, a negative pressure U is formed in the second channels 8 according to the functional principle of the pressure jet suction pump. A side current VN that has been branched off and that passes through the leakage gap 11 in the direction towards the lower valve disc 3a, 3b is guided on the deflecting shoulder 1b across the throttle gap 10 in the direction towards the second channels 8 and sucked off through the negative pressure that exists there. In this process, not only all areas in the leakage room are cleaned but also and especially in the area of the leakage gap 11. A measurable negative pressure U therefore works at the seal 15 of the lower valve disc in order to protect this seal and to ensure that intensive cleaning takes place on one hand but that no cleaning medium leaks through to the product line 1 on the other hand.

Lower Lift Position X in FIG. 5

For cleaning of the lower seat 1a, the lower valve disc 3a, 3b is moved downwards while the upper valve disc 2a, 2b continues to seal towards the product line 2. Cleaning medium flows under pressure through the throttle gap 10 that is open in this case. The flow divider 5 thereby remains in its position as it is intercepted on the upper valve disc 2a, 2b and as it stands at a distance from the deflecting shoulder 1b. The cleaning medium VE that flows in is divided on the flow divider 5 into a main flow VH and a side flow VN. The main flow VH is deflected on the flow divider 5 and runs with a high speed through the second channels 8 up to the leakage outlet 16. The side flow VN passes through the leakage gap 11 in the direction towards the upper valve disc 2a, 2b. Due to the fast flow around the extensions 5c of the flow divider 5 and through the downward-oriented inflow into the leakage outlet 16, the main flow VH creates a negative pressure U in the first channels 5a according to the functional principle of a pressure jet suction pump. The side flow VN is deflected in the upper leakage room part on the upper valve disc 2a, 2b in the direction towards the first channels and sucked off through the negative pressure U to the leakage outlet 16. A direct flow contact of the axial seal 14 is prevented through the axial seal 14 of the upper valve seat 2a, 2b that is recessed towards the outside.

Opening of the Double Seat Valve in FIG. 6

The lower valve disc 3a, 3b is adjusted in an upward direction until it comes in sealing contact with the flow divider 5 and carries along this flow divider. In the further course of the opening, the pressure spring 7 that charges the flow divider 5 is compressed until the flow divider 5 fits on the upper valve disc 2a, 2b in a sealing way. Up to this phase, the radial seal 15 of the lower valve disc 2a, 3b further stands in sealing encroachment with the seat 1a so that leakage-free switching is ensured. In the further course of the opening, both valve discs will be moved as far upwards with the flow divider 5 wedged between them as to enable a transfer of the product between the product lines 1, 2. The abutment 20 of the spring 7 thereby rests directly on the drive rod 21 so that the spring force increases the sealing force between the flow divider 5 and the lower valve disc 3a, 3b as the forces of the passive spring 22 and the pressure spring 7 add up.

Through the division of the volumetric flow VE into the main flow VH and the side flow VN, the cleaning medium that reaches the respective opposite seal is significantly reduced in its quantity and flow speed, which results in a pressure-free deflection and discharge of the cleaning medium towards the leakage outlet 16. Nevertheless, all areas are wetted and cleaned, in particular the leakage gap 11 between the flow divider 5 and the valve housing. Through the arrangement of the axial seal 14 of the upper valve disc 2a, 2b, this axial seal does not come in direct contact with the flow and consequently a transition of the cleaning medium past the axial seal into the product line 2 is no longer possible as a result of the created negative pressure U. The radial seal 15 of the lower valve disc 3a, 3b is protected against direct flow contact by the Deflecting shoulder 1b. Likewise, a transition of cleaning medium past the radial seal into the product line 1 is avoided through the negative pressure U. All areas in the leakage room L can be cleaned safely in every lift position due to the arrangement of the flow divider 5 and the condition that it is surrounded completely by the flow in a cleaning cycle. Hence, a double seat valve V can be implemented, which does not differ from standard valves for other markets in terms of its structural dimensions and its mass. In the product area, no additional seals are required and also the PMO requirements will be met without any problem if the maintenance workload is not increased.

The embodiment of the double seat valve V in the FIGS. 7 and 8 is different from the one of the FIGS. 1 to 6 in that the axial direction 14 protrudes over the seat area 1c towards the inside and is therefore used in the open position of the valve for sealing the flow divider 5 on the upper valve disc 2a, 2b, and the flow divider 5 rests on the deflecting shoulder 1b in the lower lift position (FIG. 8). In the upper lift position in FIG. 8, the flow divider 5 is in turn lifted during lifting of the upper valve disc 2b for example by 2.5 mm after a stroke path of 1.5 mm over 1.0 mm and lifted off the deflecting shoulder 1b so that the leakage gap 11 can be permeated by the side flow. The external circumference 30 of the flow divider 5 could be cylindrical in this case.

This means that, although in the lower lift position in FIG. 9 a negative pressure is created in the area of the seal 14 of the upper valve disc 3a, 3b that protects this sealing seal, the upper leakage room part is not rinsed in a cleaning way. In this lift position, the flow divider 5 has the additional function of a deflector according to the known state of the art. Hence, the leakage gap 11 is only cleaned respectively in the upper lift position in FIG. 8, in which the embodiment of the double seat valve V mostly corresponds to the variant illustrated in FIG. 1-6 in functional terms.

The invention claimed is:

1. A double seat valve for optional separation and connection of two product lines in a valve housing that has seats, which seats are axially separated by a leakage room adjacent to a leakage outlet, upper and lower valve discs with a generally circular ring-shaped flow divider that is guided in an axially movable way and that delimits upper and lower leakage room parts between the valve discs, wherein, independently of the respective other one, the upper valve disc can be set to an upper lift position and the lower valve disc to a lower lift position respectively to supply a cleaning medium under pressure from respectively one product line into the leakage room, and wherein at least axial first channels, which are each distributed around the axis of the valve housing in the flow divider starting from the upper leakage room part, and axial second channels starting from the lower leakage room part in the lower valve disc towards the leakage outlet are provided, the first channels being disposed in extensions of the flow divider that axially bridge the lower leakage room part and that end within the second channels, the second channels surround the extensions at a radial distance on the outside, and at least in one lift position a seal-free external circumference of the flow divider forms a leakage gap between the upper leakage room part and the lower leakage room part for a side flow of the cleaning medium that is smaller than a main flow that is deflected and directed by the flow divider into the first channels or into the second channels and to the leakage outlet, the main flow creating a negative pressure in the channels respectively not passed by the main flow and due to a pressure jet pump suction effect, the negative pressure as well acting into the lower or upper leakage room part respectively located in the upper lift position of the upper valve disk or in the lower lift position of the lower valve disk adjacent to the channels of the first and second channels currently not passed by the main flow.

2. The double seat valve according to claim 1, further comprising a circumferential deflecting shoulder formed in an external wall of the leakage room at least for the side flow occurring in the upper lift position, and the flow divider rests in the lower lift position either on the deflecting shoulder or at a distance from the deflecting shoulder on an end stop of the upper valve disc.

3. The double seat valve according to claim 1, the flow divider having a collar that is guided in a sealed way on the inside at least in the upper valve disc and that is biased by one end of a pressure spring in the direction towards the lower valve disc, the pressure spring resting with another end on a drive rod of the lower valve disc.

4. The double seat valve according to claim 3, the collar being screwed together with a ring insert, which is guided on the drive rod of the lower valve disc, the ring insert being slidable in a recess of the upper valve disc, the ring insert supporting the pressure spring, and the ring insert having a shoulder that is aligned to an end stop provided on the upper valve disc.

5. The double seat valve according to claim 1, the inner side of the flow divider in a sealed way is movably guided along the drive rod of the lower valve disc.

6. The double seat valve according to claim 2, adjacent to a seat of the upper valve disc the external wall of the leakage room has a cylindrical section that is followed up to the deflecting shoulder by a gradual widening shorter.

7. The double seat valve according to claim 1, the external circumference of the flow divider being formed either cylindrically or with a concave circumferential waist.

8. The double seat valve according to claim 1, a top side of the flow divider facing the upper valve disc having a circumferential sealing edge and a concave cavity within the sealing edge.

9. The double seat valve according to claim 1, an outer diameter of the external circumference of the flow divider being larger than an inner diameter of a seat for the lower valve disc, the lower valve disc having a sealing edge that is aligned to the bottom side of the flow divider and a top side of the lower valve disc facing the flow divider is sloped inwardly.

10. The double seat valve according to claim 2, a cylindrical seat for the lower valve disc extending to a position adjacent the deflecting shoulder and being axially longer than the axial distance from the deflecting shoulder to a seat for the upper valve disc.

11. The double seat valve according to claim 1, each extension of the flow divider containing as the first channel at least one bore hole, and an external contour after the extension gradually tapering off in the direction towards the leakage outlet.

12. The double seat valve according to claim 1, the leakage outlet having a funnel-shaped collecting section whose funnel wall inclination is nearly equivalent to the slope of the passage openings that form the first channels and to the slope of external walls of the second channels in the lower valve disc.

13. The double seat valve according to claim 1, the flow divider having at least one inner axial guiding groove for the engagement of a guiding nose provided in the lower valve disc, the engagement between the guiding groove and the guiding nose maintaining equal spacings between the external contours of the extensions and internal walls of the second channels.

14. The double seat valve according to claim 1, and on a lower side of the upper valve disc facing the flow divider a concave and rounded guide fin aligned to the leakage gap is provided.

15. The double seat valve according to claim 1, the flow divider comprising fiber-reinforced or unreinforced plastic.

16. The double seat valve according to claim 6, the gradual widening in the axial direction being shorter than the axial height of the external circumference of the flow divider.

17. The double seat valve according to claim 8, a seat for the upper valve disc being a conical surface substantially directed into the cavity.

18. The double seat valve according to claim 9, a top side of the lower valve disc being sloped inwardly in a conical fashion.

19. The double seat valve according to claim 15, the fiber-reinforced or unreinforced plastic of the flow divider comprising PEEK (polyether ether ketone).

\* \* \* \* \*